(12) United States Patent
Sheppard et al.

(10) Patent No.: US 9,441,744 B2
(45) Date of Patent: Sep. 13, 2016

(54) VALVE APPARATUS

(75) Inventors: Jeff Sheppard, Milton (CA); Dario Bettio, Mississauga (CA); Sachin Bhatia, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 581 days.

(21) Appl. No.: 13/329,479

(22) Filed: Dec. 19, 2011

(65) Prior Publication Data

US 2012/0161042 A1 Jun. 28, 2012

Related U.S. Application Data

(60) Provisional application No. 61/426,547, filed on Dec. 23, 2010.

(51) Int. Cl.
| | |
|---|---|
| *G05D 23/02* | (2006.01) |
| *F16K 11/07* | (2006.01) |
| *F01M 5/00* | (2006.01) |
| *F16K 31/00* | (2006.01) |
| *F16H 57/04* | (2010.01) |

(52) U.S. Cl.
CPC .............. *F16K 11/07* (2013.01); *F01M 5/007* (2013.01); *F16K 11/0716* (2013.01); *F16K 31/002* (2013.01); *F16H 57/0413* (2013.01); *F16H 57/0475* (2013.01); *Y10T 29/49417* (2015.01)

(58) Field of Classification Search
CPC ........... G05D 23/136; G05D 23/1346; G05D 23/27529; G05D 23/08; G05D 23/022; G05D 23/128; F24F 11/0012; F25B 41/062; E03C 1/041; F16K 11/07; F16K 31/002; F16K 11/0716; F01M 5/007; F16H 57/0475; F16H 57/0413

See application file for complete search history.

(56) References Cited

U.S. PATENT DOCUMENTS

| | | | | |
|---|---|---|---|---|
| 2,471,533 | A | | 5/1949 | Morgan |
| 2,719,518 | A | * | 10/1955 | Newman ........................ 123/557 |
| 3,136,337 | A | | 6/1964 | Fox |
| 3,442,078 | A | | 5/1969 | Nolan |
| 3,563,093 | A | | 2/1971 | Scherer |
| 3,721,421 | A | | 3/1973 | Cliff |
| 3,939,283 | A | * | 2/1976 | Billington ..................... 426/250 |
| 4,961,530 | A | | 10/1990 | Wagner |
| 5,042,447 | A | * | 8/1991 | Stone ..................... F02M 31/16 |
| | | | | 123/541 |

(Continued)

FOREIGN PATENT DOCUMENTS

| | | |
|---|---|---|
| JP | 58221090 A | 12/1983 |
| JP | 59006474 A | 1/1984 |

*Primary Examiner* — M. Alexandra Elve
*Assistant Examiner* — Larry Furdge
(74) *Attorney, Agent, or Firm* — Marshall & Melhorn, LLC (57) ABSTRACT

A valve apparatus having a first housing coupled to a second housing. The first housing having a first chamber in fluid communication with a first inlet and a first outlet. The first chamber adapted for receiving a thermal actuator moveable from a first position to a second position in response to temperature of a first fluid in the first chamber. The second housing having a second chamber in fluid communication with a first and a second ports, the second chamber being fluidly sealed from the first chamber. The second chamber adapted for receiving a valve mechanism, which is operatively coupled to the thermal actuator and moveable from a first valve position preventing flow of a second fluid from the first port to the second port to a second valve position permitting flow of the second fluid from the first port to the second port upon actuation by the thermal actuator.

26 Claims, 5 Drawing Sheets

(56) References Cited

U.S. PATENT DOCUMENTS

| | | |
|---|---|---|
| 5,676,308 A | 10/1997 | Saur |
| 5,899,378 A | 5/1999 | Hainle et al. |
| 5,988,514 A * | 11/1999 | Huang .................... 236/12.14 |
| 6,520,418 B2 | 2/2003 | Kunze et al. |
| 6,695,217 B2 | 2/2004 | Leu et al. |
| 6,764,020 B1 | 7/2004 | Zhao et al. |
| 7,249,788 B2 * | 7/2007 | Muhammad et al. ........ 285/319 |
| 7,473,484 B2 | 1/2009 | Lecea et al. |
| 2009/0026405 A1 * | 1/2009 | Sheppard et al. ............ 251/364 |

\* cited by examiner

VALVE APPARATUS

CROSS REFERENCE TO RELATED APPLICATION

This application claims the benefit of and priority to U.S. Provisional Application No. 61/426,547 filed Dec. 23, 2010 under the title VALVE APPARATUS. The content of the above patent application is hereby expressly incorporated by reference into the detailed description hereof.

TECHNICAL FIELD

The specification relates to a valve apparatus and a method of manufacturing the same.

BACKGROUND

A variety of systems are known for regulating the temperature of a liquid, such as oil, using a heat exchanger or an oil cooler. In particular, it is known that one can regulate the temperature of oil used in a transmission with the objective of maintaining the temperature of the oil within a desirable temperature range so the temperature of the oil is neither too hot nor too cold. In one particular system for regulating the temperature of transmission oil by means of a heat exchanger, a mixing valve is provided which is able to direct either hot coolant from a vehicle engine, for example, or cold coolant flowing from a radiator, for example, through the heat exchanger so that the heat exchanger works as a heater or as a cooler. A form of mixing valve for regulating the temperature of a liquid such as coolant includes a valve housing having first and second chambers formed therein as well as inlet and outlet ports for the flow of a liquid into and out of the first chamber. Further ports are provided in the housing for the flow of coolant at either an elevated temperature or at a lower temperature into and out of the second chamber. A linear actuator in the form of a wax motor is mounted in the first chamber and has an actuator body which contains the wax and a piston movable to an extended position by expansion of the wax when the temperature of the wax is increased to a predetermined level. Since a substantial portion of the actuator body is located in the first chamber, the temperature of the actuator body and its wax is determined to some extent at least by the temperature of the liquid flowing through the first chamber. A valve mechanism including a valve spool is operable by the linear actuator with one end of the spool being operably connected to the piston for movement therewith. The valve mechanism is located in the second chamber of the housing and is capable of controlling the flow of both coolant at the elevated temperature and coolant at the lower temperature through the second chamber.

One difficulty with the aforementioned mixing valve is that it requires a number of separate components or parts mounted within the valve housing for the purpose of mounting the linear actuator. In addition, such a mixing valve can be difficult to assemble due to its complexity and can increase manufacturing costs.

Another difficulty with this aforementioned mixing valve is that it is possible for the temperature of the wax in the wax motor actuator to be influenced by not only the temperature of the liquid flowing through the first chamber but also the temperature of the coolant in the second chamber since one end of the wax motor actuator and its piston is either adjacent to or in the second chamber. The influence of the temperature of the coolant can at least in some cases adversely affect the proper operation of the wax motor actuator.

A further difficulty with the aforementioned mixing valve is the pressure drop that can occur in the second chamber, where the coolant pressure can drop using the valve mechanism as described above. The pressure drop can also affect the valve causing leakage.

Therefore, there is a need in the art for a valve apparatus that requires less components and has a simpler design, which can reduce complexity and cost of manufacturing. In addition, there is a need in the art for a valve apparatus that can mitigate against one fluid in a first chamber from contaminating a second fluid in a second chamber. Moreover, there is a need in the art for a valve apparatus that can reduce pressure drops in the second chamber, where a valve mechanism controls the ports through which fluid can flow.

SUMMARY

In one aspect, the present disclosure relates to a valve apparatus, comprising:
  a first housing coupled to a second housing;
  the first housing having a first chamber in fluid communication with a first inlet and a first outlet;
  the first chamber adapted for receiving a thermal actuator moveable from a first position to a second position in response to temperature of a first fluid in the first chamber;
  the second housing having a second chamber in fluid communication with a first port and a second port, the first chamber being fluidly sealed from the second chamber;
  the second chamber adapted for receiving a valve mechanism; the valve mechanism operatively coupled to the thermal actuator and moveable from a first valve position preventing flow of a second fluid from the first port to the second port to a second valve position permitting flow of the second fluid from the first port to the second port upon actuation by the thermal actuator.

According to another aspect, the present disclosure relates to a method of manufacturing a valve apparatus, comprising:
  moulding or casting a first housing having a first inlet, a first outlet and a first chamber in fluid communication with the first inlet and the first outlet;
  positioning a thermal actuator in the first chamber, the thermal actuator moveable from a first position to a second position in response to temperature of a first fluid in the first chamber;
  fluidly sealing the first chamber;
  moulding or casting a second housing having a first port, a second port and a second chamber in fluid communication with the first port and the second port;
  positioning a valve mechanism in the second chamber;
  operatively coupling the valve mechanism to the thermal actuator; and
  coupling the first housing to the second housing;
  wherein the valve mechanism is moveable from a first valve position preventing flow of a second fluid from the first port to the second port to a second valve position permitting flow of the second fluid from the first port to the second port upon actuation by the thermal actuator.

DETAILED DESCRIPTION

Figure 1:
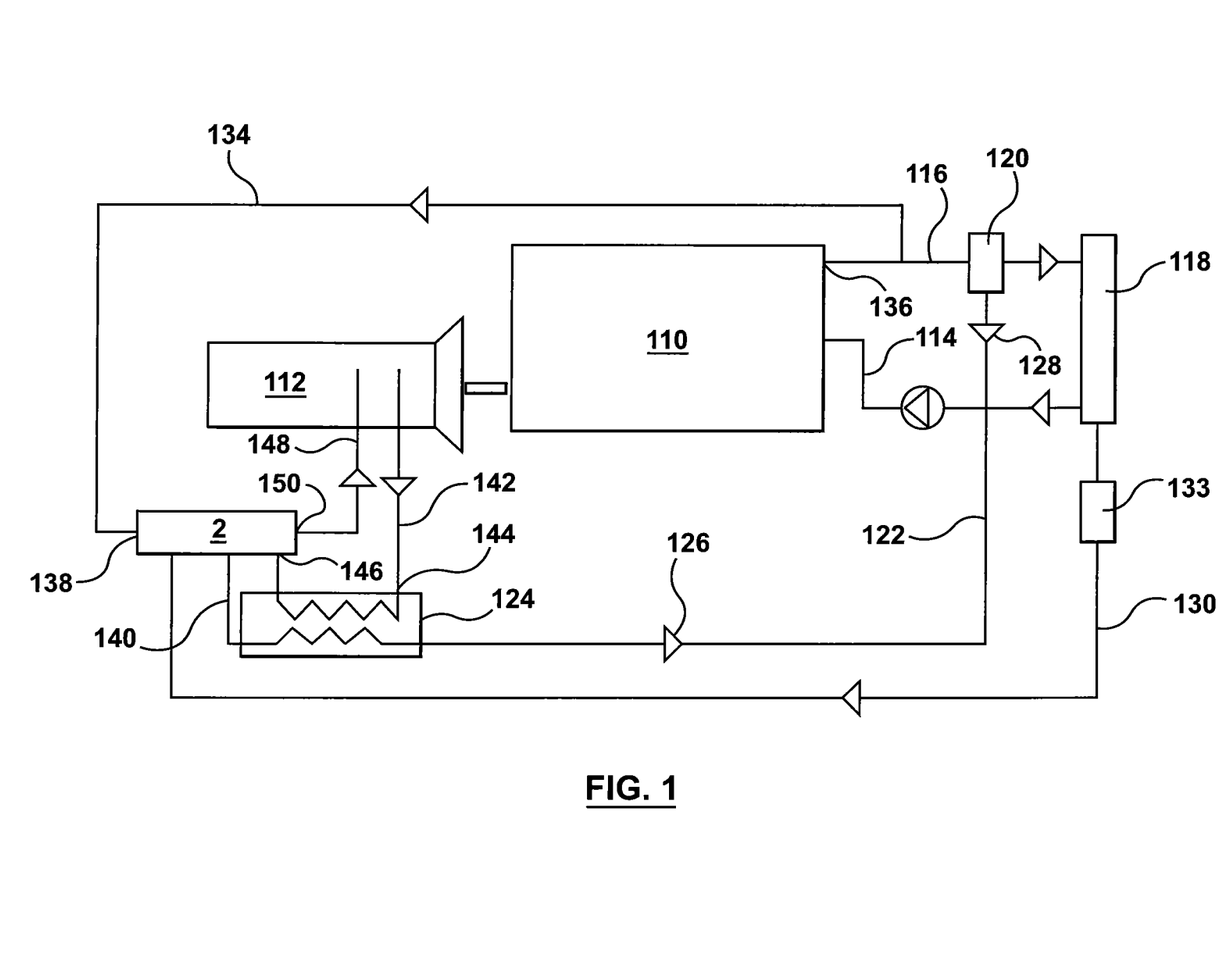
FIG. 1 is a schematic view of an engine and transmission system incorporating a radiator and an oil heat exchanger for transmission fluid or oil.

FIG. 1 illustrates schematically a cooling system for a vehicle engine 110 and a vehicle transmission 112. The engine 110 is cooled by means of passageways formed in the engine through which a coolant, normally a mixture of water and glycol can flow. This coolant, which is one form of heat exchange liquid, can flow into the engine through coolant pipe 114 and can flow out of the engine through coolant pipe 116. The coolant can be cooled by means of a standard radiator 118 having one outlet connected to the pipe 114 and an inlet connected to the pipe 116. Preferably an engine thermostat 120 is located in the line 116 and, depending on the temperature of the coolant, this thermostat is able to direct a portion of the coolant through coolant line 128 back to the engine. Connected to another outlet of the radiator 118 is a further coolant line 130 through which heat exchange liquid, i.e. coolant, at a lower temperature can flow through to a transmission oil heat exchanger 124 via a valve apparatus 2 constructed in accordance with the present disclosure. The transmission oil heat exchanger 124 can be of standard construction. Optionally a low temperature radiator 133 can be provided in the line 130 near the main radiator 118.

Another coolant line 134 connects the coolant outlet 136 of the engine to the valve apparatus 2. This line is able to carry hot coolant from the engine to an inlet 138 located at one end of the valve apparatus 2. The valve apparatus 2 is connected to the oil heat exchanger by a short line or passage 140 through which coolant can flow from the valve apparatus 2 to the heat exchanger 124. This coolant can be either hot coolant from the line 134 or cold coolant from the line 130. The temperature of coolant passing through the passage 140 depends upon the position of a valve member in the valve apparatus 2 as explained in more detail below. Transmission oil, which can be considered a "first fluid" for present purposes, is able to pass from the transmission 112 to the oil heat exchanger 124 through a line or a pipe 142 connected to an oil inlet at 144. This first fluid or oil is able to exit from the oil heat exchanger at line 146 where it passes into the valve apparatus 2 so the transmission oil can return to the transmission 112 through oil line 148 which is connected to an oil outlet 150. With this arrangement, it will be seen that the oil heat exchanger 124 is able either to heat the transmission oil by means of hot coolant or cool the transmission oil by means of the cold coolant.

The valve apparatus 2 as noted above and as illustrated in FIGS. 2 to 4, is further described herein. As noted above, the valve apparatus 2 has a first housing 4 that is coupled to a second housing 6. The first housing 4 has a first inlet 10, a first outlet 12 and a first chamber 8 in fluid communication with the first inlet 10 and the first outlet 12, so as to allow a first fluid to pass from the first inlet 10 to the first outlet 12 by entering and then exiting the first chamber 8. The first chamber 8 is appropriately sized so as to receive a thermal actuator 14, while allowing the first fluid to enter from the first inlet 10 into the first chamber 8 and then exit from the first outlet 12. The thermal actuator 14 includes an actuator piston 46 moveable from a first position 16 (as shown in FIG. 3) to a second position 20 (as shown in FIG. 4) in response to temperature of the first fluid in the first chamber 8.

The second housing 6 of the valve apparatus 2 has a second chamber 20 in fluid communication with a first port 22 and a second port 24, so as to allow a second fluid to enter from the first port 22 into the second chamber 20, and then exit from the second port 24. In the valve apparatus disclosed herein, the first chamber 8 is fluidly sealed from the second chamber 20 to prevent one fluid from contaminating the other. The second chamber 20 is appropriately sized to receive a valve mechanism 26 that controls the flow of the second fluid entering into the second chamber 20. The valve mechanism 26 is operatively coupled to the thermal actuator 14 and is moveable from a first valve position 28 (FIG. 3) to a second valve position 30 (FIG. 4) upon actuation by the thermal actuator 14. In the valve apparatus 2 described herein, the valve mechanism 26 in the first valve position 28 prevents flow of the second fluid from the first port 22 from entering into the second chamber 20, and therefore, also inhibits the second fluid from exiting to the second port 24. While the valve mechanism 26 in the second valve position 30 permits flow of the second fluid from the first port 22 to the second port 24, and thereby permits the flow of the second fluid from the first port 22 to the second port 24.

Figure 2:
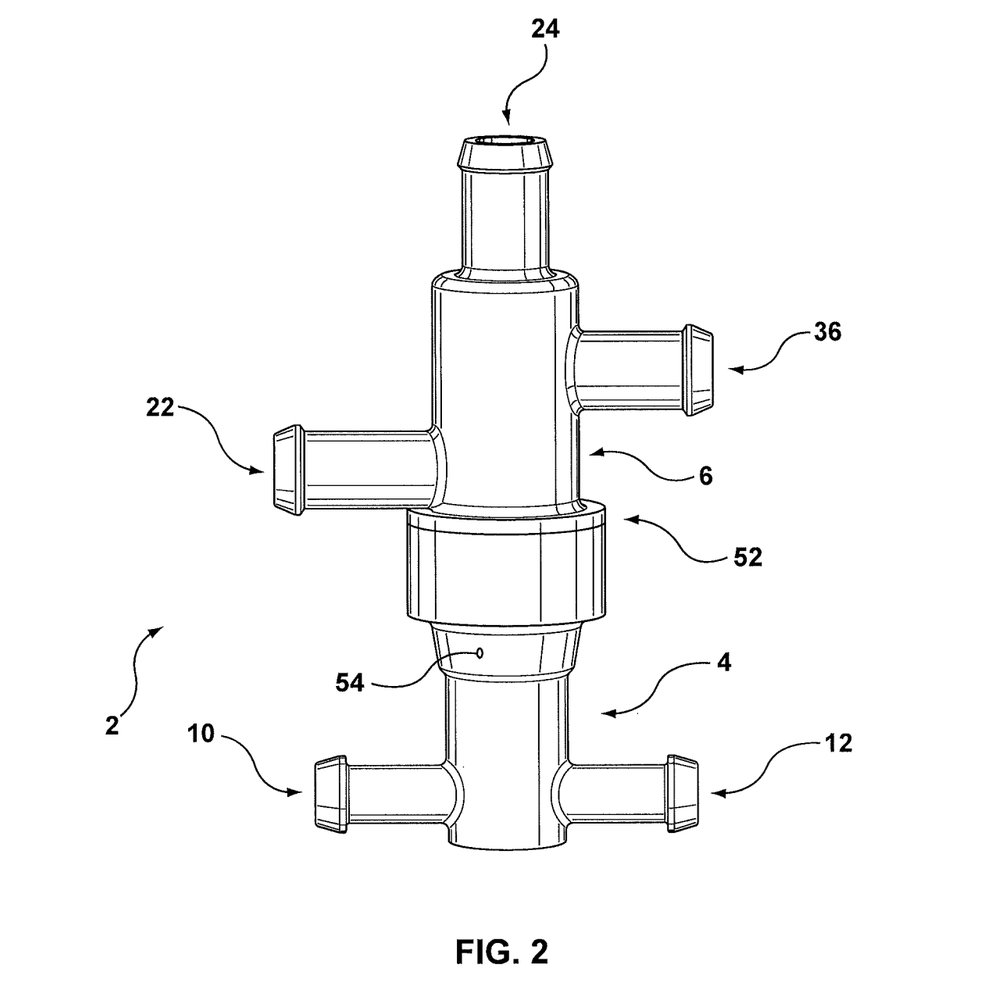
FIG. 2 is a side elevational view of a valve apparatus according to the present description.
Figure 3:
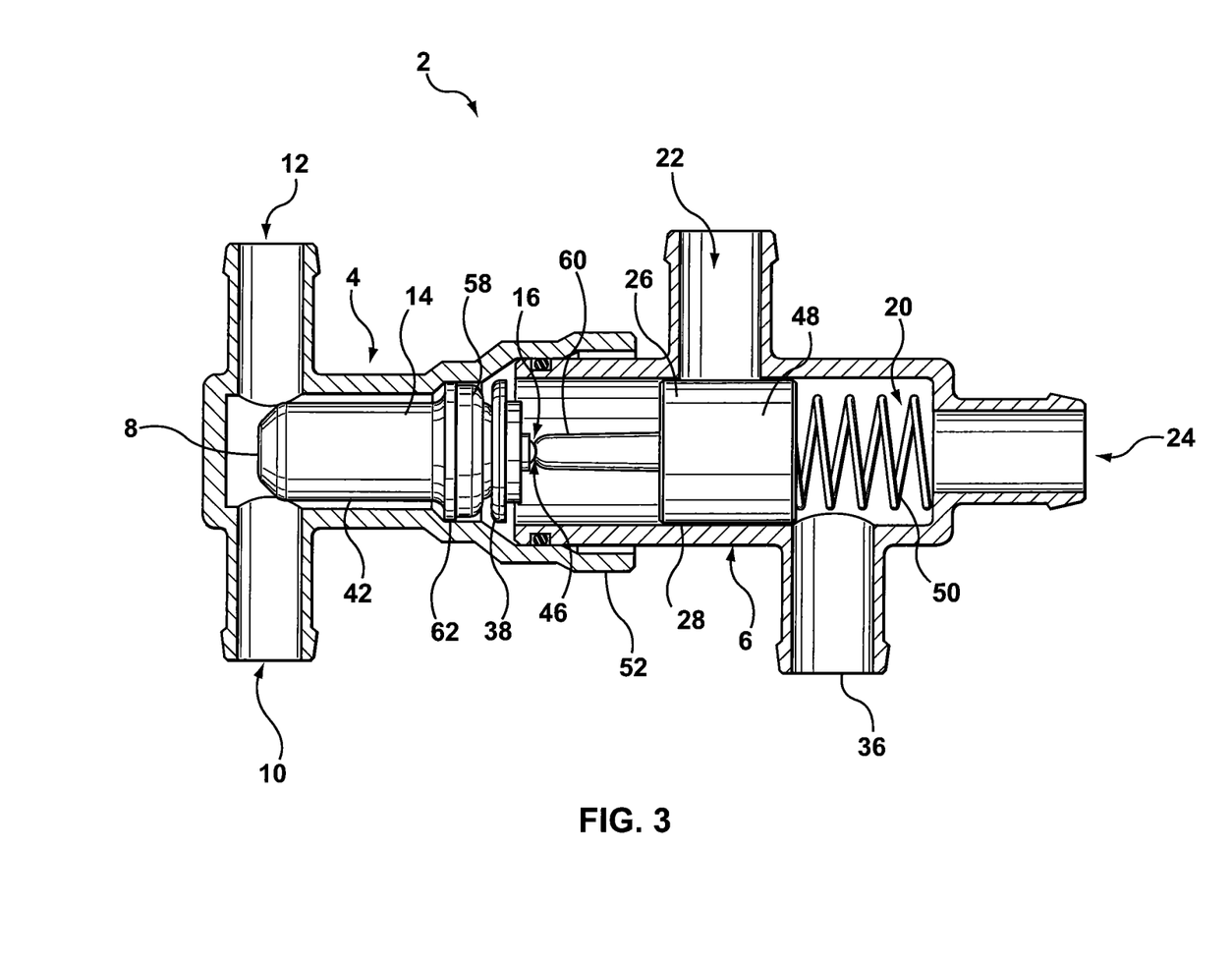
FIG. 3 is a side elevational view of a valve apparatus according to the present description with the housing in phantom and the valve position permitting hot coolant flow.
Figure 4:
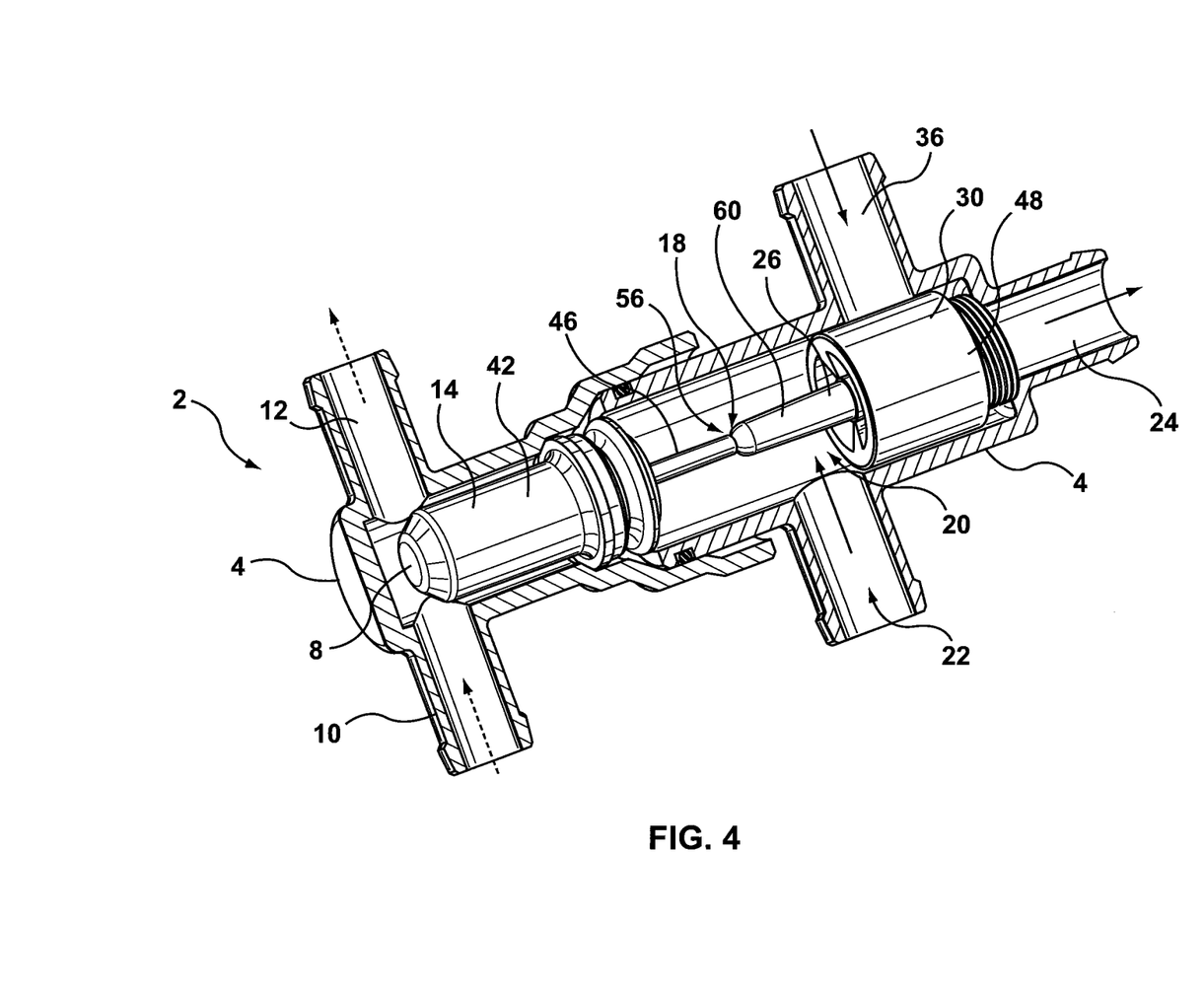
FIG. 4 is a perspective view of a valve apparatus according to the present description with the housing in phantom and the valve position permitting cold coolant flow.

In one embodiment, for example and without limitation, the valve apparatus 2 has a third port 36 in the second housing 6, as shown in FIGS. 2 to 4. The number of ports is not particularly limited, and based on the valve design and valve requirements, additional ports can be present. In the embodiment disclosed, the third port 36 functions as another input port into the second chamber 20 and the valve mechanism 26 in the first valve position 28 (FIG. 3) permits flow of the second fluid from the third port 36 to the second port 24, while the flow of the second fluid from the first port 22 is inhibited. In the second valve position 30 (FIG. 4), flow of the second fluid from the third port 36 is inhibited, while allowing flow from the first port 22 to the second port 24.

The positioning of the ports is not particularly limited and can be established based on the design requirements of the valve apparatus 2. In the valve apparatus 2 described herein, the first port 22 and the third port 36 are positioned so the first port 22 is diametrically opposed and axially offset from the third port 36; and the second fluid flow from both the first port 22 and the third port 36 is perpendicular to the second fluid flow from the second port 24. In another embodiment, the ports can be positioned as disclosed in US Patent application publication no. 2010/0181516, incorporated herein by reference.

The thermal actuator 14 used in the valve apparatus 2 disclosed herein is not particularly limited. In the embodiment disclosed herein, the thermal actuator 14 has a piston 46 having a first end coupled to an actuator body 42 that contains a contractionally expandable material. The second end 56 of the piston engages the valve mechanism 26. In one embodiment, the actuator body 42 is thermally conductive and the piston 46 is thermally non-conductive.

The contractionally expandable material used in actuator body 42 could take various forms. In one embodiment, for example and without limitation, the contractionally expandable material is wax. In another example embodiment, a shape memory material could be used. The contractionally expandable material expands when heated and therefore occupies more space, and when cooled, the material contracts. This affects the movement of the piston 46, which moves from the first position 16 to the second position 18 upon expansion of the contractionally expandable material. As the second end 56 of the piston 46 engages the valve mechanism 26, movement of the piston 46 from the first position 16 to the second position 18 upon expansion of the contractionally expandable material actuates the valve mechanism 26, causing it to move from the first valve position 28 to the second valve position 30; and thereby controlling flow of the second fluid in the second chamber 20.

In one embodiment of the valve apparatus 2 disclosed herein, the first chamber 8 is fluidly sealed from the second chamber 20 to prevent one fluid from contaminating another fluid. In the embodiment disclosed herein, the first chamber 8 is fluidly sealed using a sealing disc 38 having an aperture. The sealing disc 38 engages a coupling end of the actuator body 58 for thermally isolating the actuator body 42 from the second fluid, thereby mitigating against the contractionally expandable material from being affected by the temperature of the second fluid. The aperture is adapted for sealingly receiving and permitting movement of the piston 46 from the first position 16 to the second position 18.

The sealing disc 38 material is not particularly limited. The sealing disc 38 material should allow the first chamber 8 to be fluidly sealed from the second chamber 20 and can also be thermally insulative. In one embodiment, for example and without limitation, the sealing disc can be of a polymeric type material.

The method of sealing the first chamber 8 using the sealing disc 38 is also not particularly limited. In one embodiment, for example and without limitation, the sealing disc is ultrasonically sealed. Other methods would include threading, clipping, retaining rings, snap fit designs, threaded fasteners and others.

In addition to the above, to prevent mixing of one fluid with another, the first chamber 8 can be provided with an O-ring 62 that inhibits the first fluid in the first chamber 8 from contacting the coupling end of the actuator body 58, while permitting the first fluid to interact with the remaining portion of the actuator body 42 located in the first chamber 8. The O-ring 62 described herein provides a secondary seal that may be eliminated if a leak free joint can be achieved, for example and without limitation, through ultrasonic welding.

The valve mechanism 26 used in the valve apparatus 2 described herein, is not particularly limited. In one embodiment, and as disclosed in FIGS. 3 and 4, the valve mechanism 26 contains a reciprocating sleeve member 48 that allows the second fluid to axially flow through the sleeve member 48. The sleeve member 48 has a sleeve member end 60 that is coupled to the second end of the piston 56; thereby allowing the sleeve member 48 to move from the first valve position 28 to the second valve position 30 upon actuation. The sleeve member 48 acts as an incremental flow regulator as it incrementally moves between the first and second positions, incrementally opening port 22 as port 36 is incrementally closed, and vice versa. In another embodiment, the valve mechanism contains a spool as disclosed in US Patent application publication no. 2010/0181516, and incorporated herein by reference. In the embodiment shown in FIGS. 3 and 4, the valve mechanism contains the sleeve member 48 coupled to the thermal actuator 14. The sleeve member 48 is made up of a hollow cylindrical body having opposing open ends. The hollow cylindrical body of the sleeve member 48 has an axis, with the axis of the sleeve member 48 being in line with an axis of the second chamber 20. The position of the sleeve member 48 with the opposing open ends allows for axial flow therethrough of the fluid flowing through the second chamber 20, while the position of the sleeve member 48 can help to control flow of the second fluid from the first port 22 to the second port 24, which is shown in FIGS. 3 and 4. Moreover, as shown in FIGS. 3 and 4, the outer wall of the sleeve member 48 is in contact with an inner wall of the second chamber 20.

In an example embodiment of the valve apparatus 2 described herein, the second chamber 20 contains a biasing means 50 that biases the valve mechanism 26 or the sleeve member 48 to the first valve position 28. The biasing means 50 used in the valve apparatus 2, described herein, is not particularly limited, and can take various forms. In one embodiment, for example and without limitation, the biasing means is a spring.

The relative location of the coupling between the first housing 4 and the second housing 6 can be done in a variety of locations. In one embodiment, for example and without limitation, and as shown in FIGS. 2 to 4, the first housing 4 is substantially centrally coupled 52 to the second housing 6.

The method of coupling the first housing 4 to the second housing 6 is also not particularly limited. In one embodiment, for example and without limitation, the first housing 4 is sealably coupled to the second housing 6 by clipping, twist locked, ultrasonically coupled or spin welded. In another example embodiment, the first and second housings 4,6 can be, for example and without limitation, a male/female interlock. The male/female interlock can be, for example and without limitation, threaded to couple the first and second housing 4,6. In a further example embodiment, the first and second housings 4,6 could have abutting edges to a provide a butt joint. The butt joint can be, for example and without limitation, clipped or coupled using other means. In still another example embodiment, the first and second housings 4,6 have complementarily toothed sections that can used to couple the housings. The toothed sections can assist in alignment of the first and second housings 4,6. In another further embodiment, an O-ring can be used to assist in the coupling of the first and second housings 4,6. The O-ring can be present, for example and without limitation, in between the first and second housings 4,6.

The material used for the first and second housings 4, 6 of the valve apparatus 2 is not particularly limited. In one embodiment, for the example and without limitation, the first housing 4 can be heat insulative, to avoid loss of heat of the first fluid in flowing through the first chamber 8. While the second housing 6 can be transmissive permitting dissipation of heat of the second fluid flowing through the second chamber 20. The use of the first housing 4 and the second housing 6 can allow for the valve apparatus 2 to be designed, such that one housing is heat insulative, while the other housing is heat transmissive. The material used for the first and second housings 4,6 is not particularly limited, and appropriate material can be selected depending upon the requirements, such as, for example and without limitation, design, extent of heat insulation/transmission and coupling of the housings. In one embodiment, for example and without limitation, the first housing 4 is made of a heat insulative plastic, and the second housing 6 is made of a heat transmissive plastic. Other materials for the housing can include, for example and without limitation, aluminum, steel, ceramic coated metal and others.

In a further embodiment, the valve apparatus 2 as described herein contains a relief opening 54 in the first housing 4. The relief opening 54 can be for example and without limitation, an opening in the first housing 4 that allows the first fluid that escapes from the first chamber 8 and moves towards the second chamber 20 to seep out of the valve apparatus 2. The relief opening can provide safety and also can help to prevent mixing of one fluid with another. The position of the relief opening 54 is not particularly limited. In one embodiment, for example and without limitation, the relief opening 54 can be positioned near the coupling end of the actuator body 58 in the first housing 4.

In another aspect, the present disclosure relates to a method of manufacturing the valve apparatus 2, as disclosed herein. The method contains the step of moulding or casting a first housing 4 having a first inlet 10, a first outlet 12 and a first chamber 8 in fluid communication with the first inlet 10 and the first outlet 12. A thermal actuator 14 is then positioned in the first chamber 8. The thermal actuator 14 is moveable from a first position 16 to a second position 18 in response to temperature of a first fluid in the first chamber 8. The first chamber 8 is then fluidly sealed. Testing can be performed to check the sealing of the first chamber 8. A second housing 6 is moulded or cast, which has a first port 22, a second port 24 and a second chamber 20 in fluid communication with the first port 20 and the second port 24. A valve mechanism 26 is positioned in the second chamber 20 of the second housing 6, which is operatively coupling to the thermal actuator 14. The first and second housings are then coupled to form the valve apparatus 2.

The step of moulding or casting the first and second housings is not particularly limited, and should be known or can be determined by a skilled worker. The step can be established based on the material of the housing, which is also not particularly limited, and should be known or can be determined by a skilled worker based on the use of the valve apparatus 2.

Figure 5:
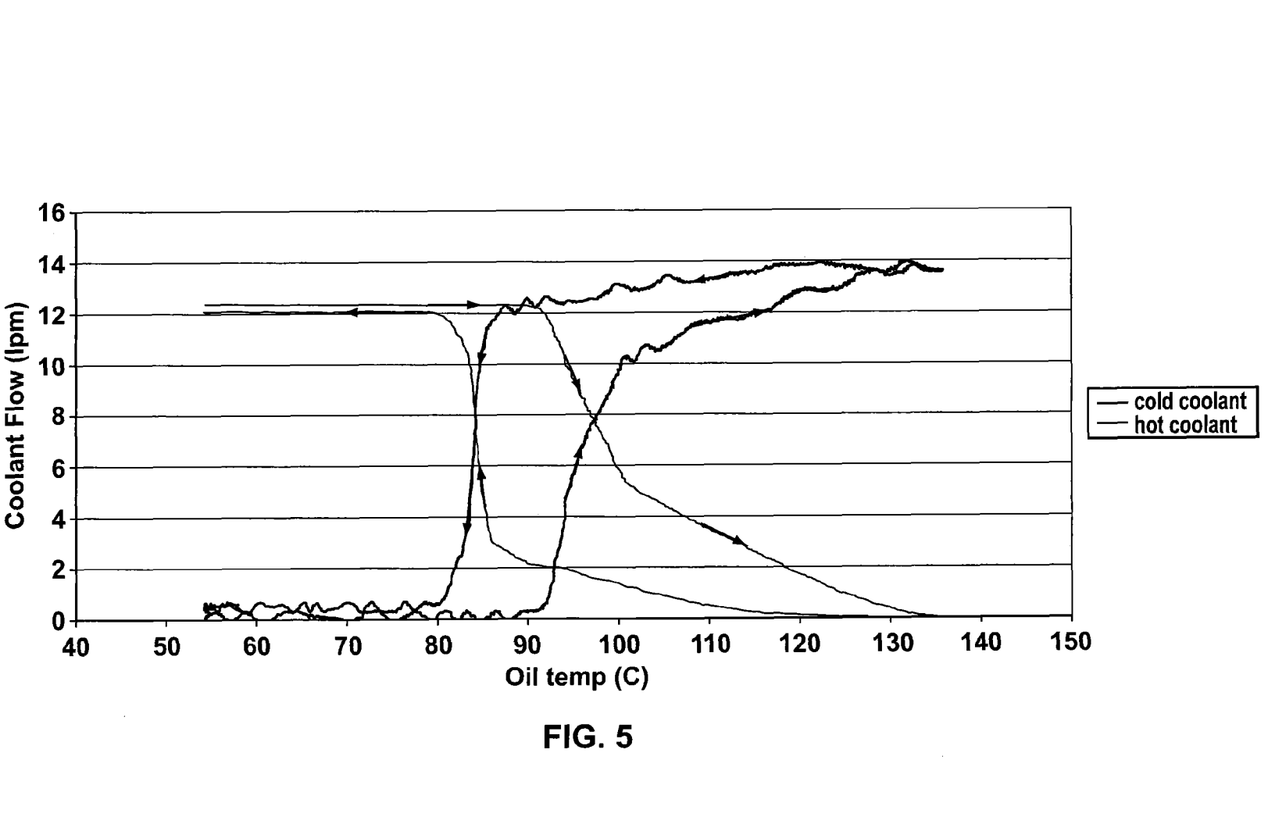
FIG. 5 is a graph showing cold and hot coolant flows as a function of oil temperature in a valve apparatus according to the present description.

FIG. 5 discloses by way of non-limiting example, the hot and cold coolant flow in the second chamber 20 as a function of the oil temperature in the first chamber 8 in an embodiment of the valve apparatus 2 according to the present description. The cold coolant inlet temperature is at about 40° C. and the hot coolant inlet is at about 90° C. At low oil temperatures, hot coolant is allowed to flow through the valve apparatus 2. As the oil temperature rises, the valve mechanism 26 moves from the first valve position 28 to the second valve position 30, allowing more cold coolant to enter the second chamber 20 and get directed into the heat exchanger to cool the oil.

While the present invention has been illustrated and described as embodied in an exemplary embodiment, that is an embodiment having particular utility regulating a temperature of a liquid such as automatic transmission fluid by means of a heat exchanger and a coolant such as a water-glycol mixture, it is to be understood that the present invention is not limited to the details shown herein, since it will be understood that various omissions, modifications, substitutions and changes in the forms and details of the disclosed system and valve apparatus and their operation may be made by those skilled in the art without departing in any way from the spirit and scope of the present invention.

The invention claimed is:

1. A valve apparatus, comprising:
a first housing coupled to a second housing;
the first housing having a first chamber in fluid communication with a first inlet and a first outlet; the first inlet for receiving a first fluid from a first source;
the second housing having a second chamber in fluid communication with a first port and a second port, the first chamber being fluidly sealed from the second chamber; the first port for receiving a second fluid from a second source;
a thermal actuator positioned in the first chamber and responsive to temperature of the first fluid in the first chamber;
a valve mechanism positioned in the second chamber; the valve mechanism coupled to the thermal actuator for movement thereby to control the flow of the second fluid from the first port to the second port, the valve mechanism comprising a sleeve member coupled to the thermal actuator, the sleeve member comprising a hollow cylindrical body having opposing open ends, the axis of the sleeve member being in line with an axis of the second chamber, wherein the sleeve member permitting axial flow therethrough and position of the sleeve member controlling flow of the second fluid from the first port to the second port, and an outer wall of the sleeve member being in contact with an inner wall of the second chamber;
wherein the first fluid from the first source is different from the second fluid from the second source, and the first fluid from the first source remains separated and prevented from mixing with the second fluid from the second source.

2. The valve apparatus according to claim 1, wherein the thermal actuator comprises:
an actuator body coupled to a piston, the actuator body containing a contractionally expandable material and one end of the piston engaging the valve mechanism, the contractionally expandable material effecting movement of the piston from a first position to a second position and
wherein the actuator body is housed in the first chamber and fluidly sealed from the second chamber.

3. The valve apparatus according to claim 2, further comprising:
a sealing disc having an aperture, the sealing disc fluidly sealing the first chamber from the second chamber and the aperture adapted for permitting movement of the piston from the first position to the second position.

4. The valve apparatus according to claim 1, further comprising a spring in the second chamber, the spring biasing the valve mechanism to the first valve position.

5. The valve apparatus according to claim 1, wherein the valve apparatus has the first housing and second housing centrally coupled.

6. The valve apparatus according to claim 1, wherein the first housing and second housing are coupled by spin welding, clipping, twist locking or ultrasonic coupling.

7. The valve apparatus according to claim 1, wherein the first housing and second housing couple by having a male portion and a female portion or abutting edges.

8. The valve apparatus according to claim 1, wherein the first housing is heat insulative and the second housing being heat transmissive.

9. The valve apparatus according to claim 1, wherein the first housing further comprises a relief opening for inhibiting mixing of the first fluid in the first chamber with the second fluid in the second chamber.

10. The valve apparatus according to claim 1, wherein the valve mechanism is moveable from a first valve position preventing flow of the second fluid from the first port to the second port to a second valve position permitting flow of the second fluid from the first port to the second port.

11. The valve apparatus according to claim 1, further comprising:

a third port in the second housing, and wherein the valve mechanism in the first valve position permits flow of the second fluid from the third port to the second port and the valve mechanism in the second valve position prevents flow of the second fluid from the third port to the second port.

12. The valve apparatus according to claim 11, wherein the first port and third port are diametrically opposed and axially offset from each other, and the second port is perpendicular to the first port and the third port.

13. A method of manufacturing a valve apparatus, comprising:
moulding or casting a first housing having a first inlet, a first outlet and a first chamber in fluid communication with the first inlet and the first outlet;
moulding or casting a second housing having a first port, a second port, a third port and a second chamber in fluid communication with the first port, the third port and the second port;
positioning a thermal actuator in the first chamber, the thermal actuator being responsive to temperature of a first fluid provided from a first source in the first chamber;
fluidly sealing the first chamber;
positioning a valve mechanism in the second chamber, the valve mechanism comprising a sleeve member coupled to the thermal actuator, the sleeve member comprising a hollow cylindrical body having opposing open ends, the axis of the sleeve member being in line with an axis of the second chamber, wherein the sleeve member permitting axial flow therethrough and position of the sleeve member controlling flow of the second fluid from the first port to the second port, and an outer wall of the sleeve member being in contact with an inner wall of the second chamber; and
coupling the first housing to the second housing with the thermal actuator operatively coupled to the valve mechanism;
wherein movement of the valve mechanism is controlled by the thermal actuator to control the flow of a second fluid from the first port to the second port; the second fluid being provided from a second source and
wherein the valve mechanism is moveable from a first valve position to a second valve position, the first valve position preventing flow of the second fluid from the first port to the second port and permitting flow from the third port to the second port, and the second valve position permitting flow of the second fluid from the first port to the second port and preventing flow of the second fluid from the third port to the second port, and wherein the first fluid from the first source is different from the second fluid from the second source, and the first fluid from the first source remains separated and prevented from mixing with the second fluid from the second source.

14. The method according to claim 13, wherein the first port and third port are diametrically opposed and axially offset from each other, and the second port is perpendicular to the first port and the third port.

15. The method according to claim 13, wherein the thermal actuator comprises:
an actuator body coupled to a piston, the actuator body containing a contractionally expandable material and one end of the piston engaging the valve mechanism, the contractionally expandable material effecting movement of the piston from a first position to a second position and wherein the actuator body is housed in the first chamber and fluidly sealed from the second chamber.

16. The method according to claim 15, wherein a sealing disc is used to fluidly seal the first chamber, the sealing disc having an aperture for permitting movement of the piston from the first position to the second position.

17. The method according to claim 13, further comprising positioning a spring in the second chamber, the spring biasing the valve mechanism to the first valve position.

18. The method according to claim 13, wherein the valve apparatus has the first housing and second housing centrally coupled.

19. The method according to claim 13, wherein the first housing and second housing are coupled by spin welding, clipping, twist locking or ultrasonic coupling.

20. The method according to claim 13, wherein the first housing and second housing couple by having a male portion and a female portion or abutting edges.

21. The method according to claim 13, further comprising forming a relief opening for inhibiting mixing of the first fluid in the first chamber with the second fluid in the second chamber.

22. A method for controlling fluid flow in a valve apparatus, the valve apparatus comprising:
a first housing coupled to a second housing;
flowing a first fluid from a first source through the first housing, the first housing having a first chamber in fluid communication with a first inlet and a first outlet;
flowing a second fluid from a second source through the second housing, the second housing having a second chamber in fluid communication with a first port, a second port and a third port, the second fluid being at a first temperature entering the second chamber from the first port and exiting from the second port, and the second fluid at a second temperature entering the second chamber from the third port and exiting from the second port, the first chamber being fluidly sealed from the second chamber;
a thermal actuator positioned in the first chamber and responsive to temperature of the first fluid in the first chamber;
a valve mechanism positioned in the second chamber; the valve mechanism coupled to the thermal actuator for movement thereby to control the flow of a second fluid from the first port and/or third port to the second port; the valve mechanism having a first valve position and a second valve position, the first valve position preventing flow of the second fluid from the first port to the second port and permitting flow from the third port to the second port, and the second valve position permitting flow of the second fluid from the first to the second port and preventing flow of the second fluid from the third port to the second port; and
permitting temperature of the first fluid flowing in the first chamber to actuate the thermal actuator to control flow of the second fluid in the second chamber while keeping the first fluid separate from the second fluid
wherein the valve mechanism comprises a sleeve member coupled to the thermal actuator, the sleeve member comprising a hollow cylindrical body having opposing open ends, the axis of the sleeve member being in line with an axis of the second chamber, wherein the sleeve member permitting axial flow therethrough and position of the sleeve member controlling flow of the second fluid from the first port to the second port, and an outer wall of the sleeve member being in contact with an inner wall of the second chamber; and wherein the first fluid from the first source is different from the second fluid from the second source, and the first fluid from the first source remains separated and prevented from mixing with the second fluid from the second source.

23. The method according to claim 22, wherein the first port and third port are diametrically opposed and axially offset from each other, and the second port is perpendicular to the first port and the third port.

24. The method according to claim 22, wherein the thermal actuator comprises:
   an actuator body coupled to a piston, the actuator body containing a contractionally expandable material and one end of the piston engaging the valve mechanism, the contractionally expandable material effecting movement of the piston from a first position to a second position and
   wherein the actuator body is housed in the first chamber and fluidly sealed from the second chamber.

25. The method according to claim 24, further comprising:
   a sealing disc having an aperture, the sealing disc fluidly sealing the first chamber from the second chamber and the aperture adapted for permitting movement of the piston from the first position to the second position.

26. The method according to claim 22, further comprising a spring in the second chamber, the spring biasing the valve mechanism to the first valve position.

* * * * *